June 22, 1954  D. J. BURKE  2,681,969
WELDING ELECTRODE HOLDER
Filed Dec. 26, 1950
3 Sheets—Sheet 2

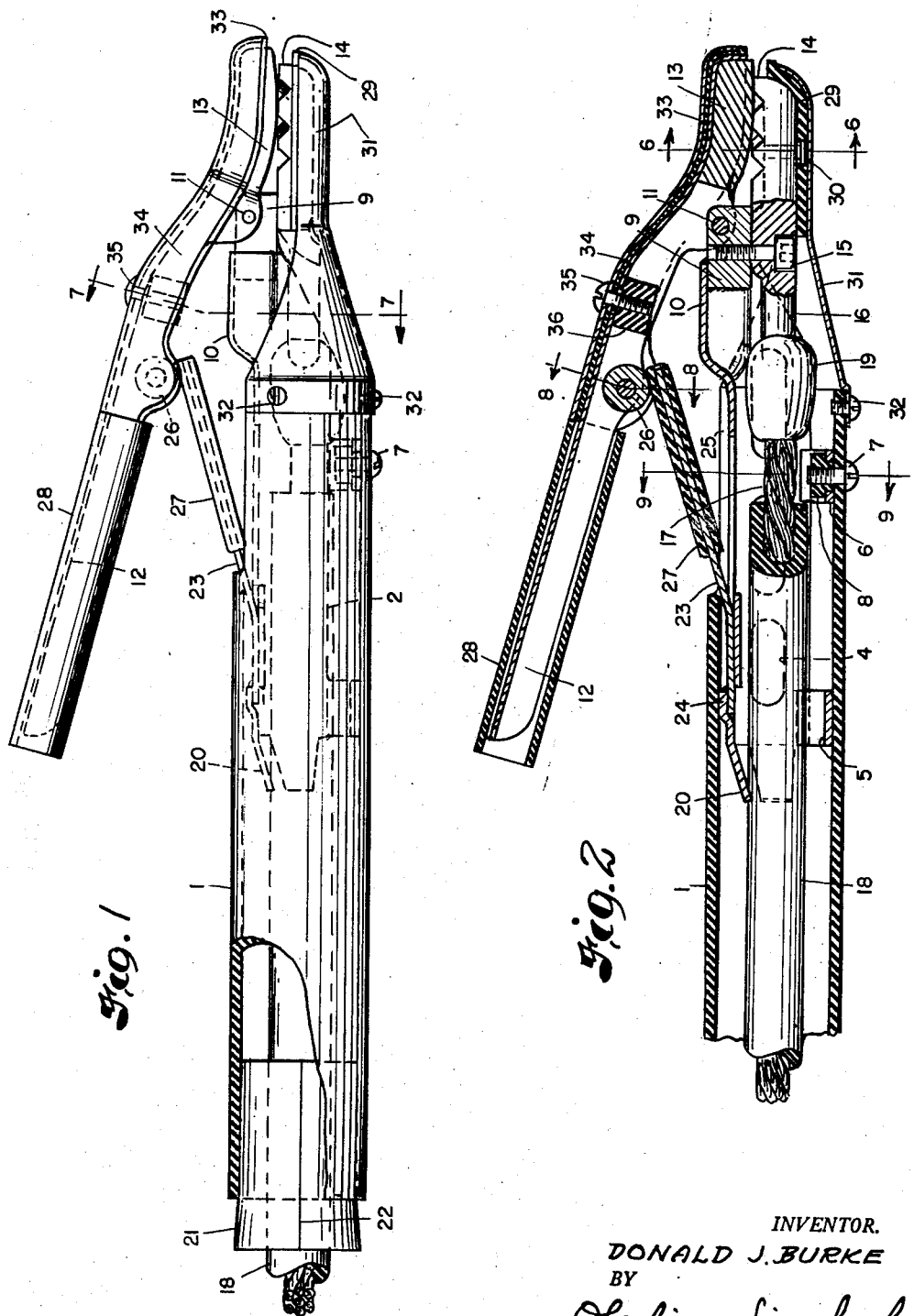

INVENTOR.
DONALD J. BURKE
BY
Oberlin + Limbach
ATTORNEYS.

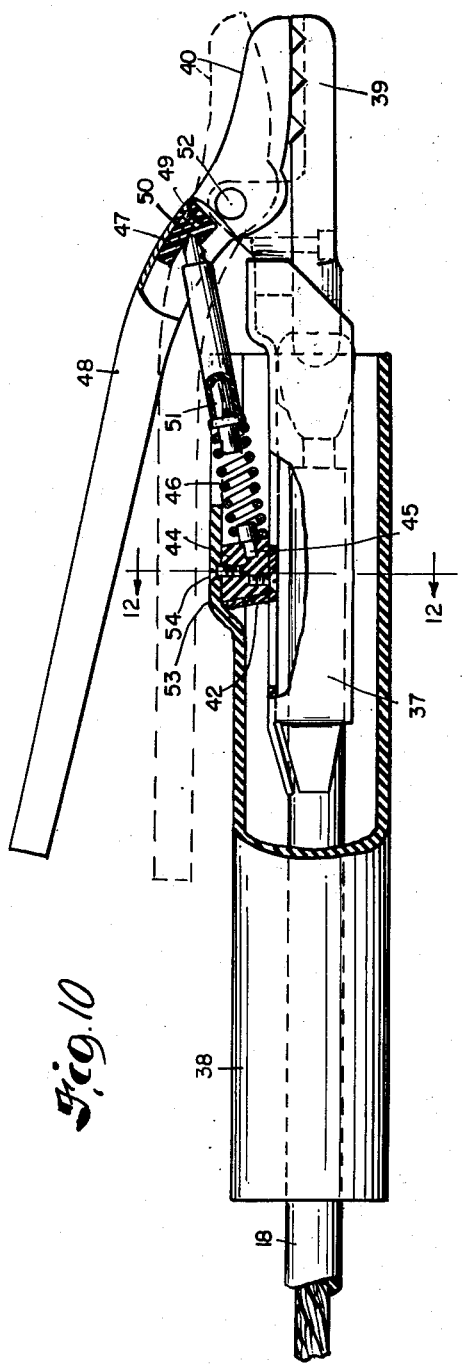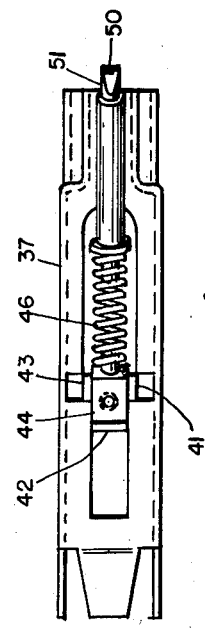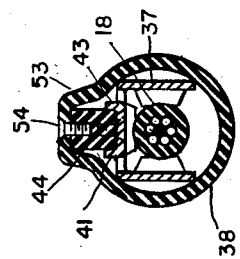

Patented June 22, 1954

2,681,969

UNITED STATES PATENT OFFICE 2,681,969

WELDING ELECTRODE HOLDER

Donald J. Burke, Cleveland, Ohio, assignor to Erico Products, Inc., Cleveland, Ohio, a corporation of Ohio Application December 26, 1950, Serial No. 202,754

10 Claims. (Cl. 219—8)

This invention relates as indicated to a welding electrode holder, and more particularly to a manual arc welding electrode holder of improved construction.

Manual electrode holders for use in arc welding have been produced in many different forms, but the type of holder generally illustrated in Short Patent No. 1,628,926 has now become standard in the trade. It comprises a jaw member to which the current carrying cable is connected, a second jaw member or "tongs" pivotally connected thereto, resilient means urging such jaw members into electrode gripping relationship, and an insulated tubular handle supporting such electrode gripping means and through which the cable passes. Despite the very large number of modifications of the foregoing basic structure which have been developed and put in use, several very serious deficiencies have persisted in all known forms and have now become almost taken for granted. The jaw member to which the cable is connected is ordinarily of copper or bronze and eventually tends to become worn where it grips the electrode, so that it must be discarded. The cable is ordinarily secured to such jaw member by means of a mechanical clamp or by soldering or brazing, and such connection tends to deteriorate rapidly in use due both to the great heat generated by the arc and also to the resistance developed at the connection itself, it being understood that currents of very high amperage must pass thereacross. In order to reduce the rate of deterioration of such connection somewhat, the copper or bronze jaw member is usually much elongated so that the connection to the cable may be at a point spaced as much as possible from the electrode gripping portion of the jaw. This expedient is only partially effective, however, and results in a relatively heavy structure which is tiring to the operator as well as greatly increasing the cost of the holder.

In fact, the heat developed at such connection due to the electrical resistance of the same, as well as the heat conducted thereto by such copper or bronze jaw member, is such that the holder soon becomes too hot in use for the operator to continue to retain the same in his hand despite the insulated handle means provided. It is therefore a very common practice for the operator to use two such holders alternately, meanwhile cooling the holder not then in use by submerging the same in a bucket of water.

When the electrical connection has deteriorated to a point where the efficiency of the holder is seriously reduced, the usual practice is to cut the cable where it enters the tubular insulated handle and to discard the entire holder. Failure of such connection is encouraged by the further fact that the rubber insulation enclosing the copper strands has been removed in this region and flexing of such strands is concentrated at this point. Since the heat developed by electrical resistance and that conducted to the connection by the jaw member tends to embrittle the cable strands, it is not surprisng that such flexing results in early failure.

Another point of damage to the cable, although of less importance, is to be found where such cable enters the tubular insulated handle since the cable insulation tends to rub against the end of the handle and may become worn through in this local region.

It is accordingly a primary object of my invention to provide a manual arc welding electrode holder of greatly increased life expectancy and which will require a minimum of maintenance.

Another object is to provide a lightweight electrode holder which may be easily manipulated by the operator in use.

Still another object is to provide such holder in which the electrode clamping jaws may be of unusually hard material such as beryllium copper or even case hardened steel without appreciably increasing the cost of the holder above that of holders now commonly in use while at the same time achieving improved electrical conductivity.

Another object is to provide such holder in which the connection of the current carrying cable to the jaw member will be of greatly increased current carrying capacity and will not be subject to rapid deterioration.

Yet another object is to provide a holder in which the cable is so secured and mounted that damage thereto due to flexing adjacent the point of connection to the jaw member and abrasion due to rubbing against the handle will be avoided.

It is also an object of my invention to provide a holder which will be cool to the hand and will permit continuous operation without periodic interruption to cool the same.

Other objects of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is an elevational view of one holder embodying my invention with a portion of the tubular insulating handle broken away to disclose the arrangement of the cable mounting means;

Fig. 2 is a vertical sectional view through such holder to disclose the internal arrangement of the same;

Fig. 10 is an elevational view generally similar to Fig. 1 but illustrating a preferred form of spring means for urging the electrode clamping tongs toward closed position;

Fig. 11 is a detail top plan view of the inner body portion on which such spring means is mounted; and Fig. 12 is a vertical sectional view taken on the line 12—12 on Fig. 10.

Figure 3:
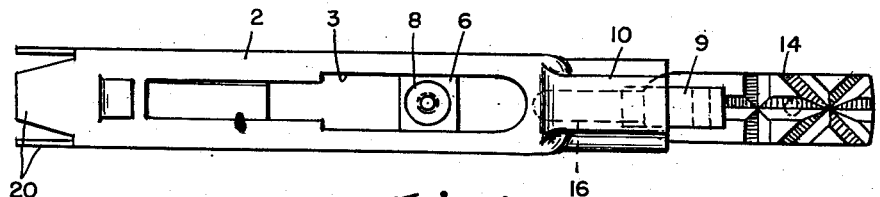
Fig. 3 is a top plan view of the metal body portion of my new holder adapted to be secured within such tubular handle and having the lower jaw member mounted thereon.
Figure 4:
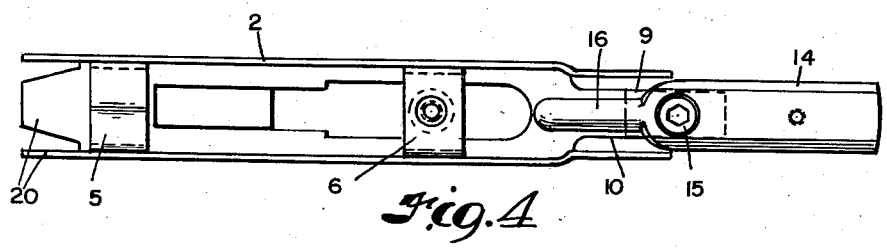
Fig. 4 is a bottom plan view of such assembly of the lower jaw member and body portion.
Figure 5:
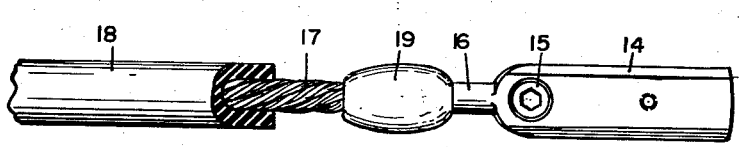
Fig. 5 is a bottom plan view of such jaw member illustrating the welded connection which I employ for securing such jaw member to the current carrying cable.
Figure 6:
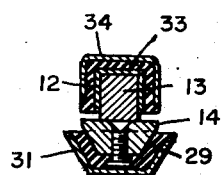
Fig. 6 is a transverse sectional view through the two jaw members taken on the line 6—6 on Fig. 2.
Figure 7:
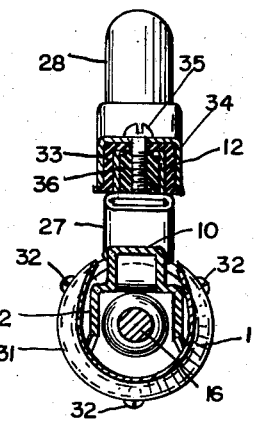
Fig. 7 is a transverse sectional view taken on the line 7—7 on Fig. 1.
Figure 8:
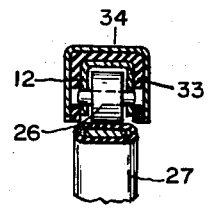
Fig. 8 is a sectional view taken on the line 8—8 on Fig. 2.
Figure 9:
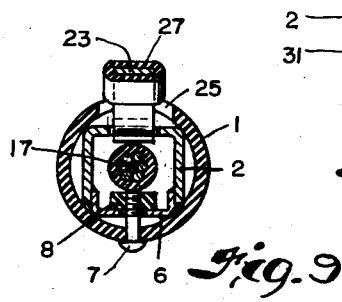
Fig. 9 is a sectional view taken on the line 9—9 on Fig. 2.

Referring now more particularly to said drawing, the embodiment of my invention illustrated in Figs. 1–9 inclusive comprises a tubular main handle member 1 of insulating material within which a sheet metal body member 2 is adapted to be secured. As best shown in Figs. 3, 4 and 9, such body member is of generally square tubular cross-section and is relieved by longitudinally extending slot 3 in its upper portion and similar shorter slots such as 4 in its respective sides. The lower side of sheet metal body member 2 (as viewed in Fig. 2) is open except where bridged by cross-members 5 and 6 and such body member is dimensioned to fit within tubular handle 1. A screw 7 passing through an insulated aperture in transverse bridge portion 6 is threadedly engaged in stud 8 of insulating material to secure member 2 fixedly in place within handle 1.

A steel block 9 is fitted within a slightly upwardly deformed end portion 10 of member 2 and secured therein as by brazing or spot-welding. To such block at 11 is pivotally connected the tong handle 12 which is of channelform cross-section and extends rearwardly in a plane including the principal handle 1. A solid steel jaw member 13 welded in tong 12 extends in the opposite direction from pivot pin 11 and is opposed by a beryllium copper jaw member 14 removably secured to the underside of block 9 by means of a screw 15. Such lower jaw member will preferably be formed with the usual grooves in its clamping surface for gripping an electrode in a variety of selected positions. Jaw 14 is also provided with a short rearward extension 16 adapted to be cast welded to the exposed end portion of the current carrying cable 17 which is, of course, enclosed within the usual rubber insulation 18 up to this point. The cast welded connection 19 will preferably be formed in the general manner taught in Cadwell Patent No. 2,229,045, the resultant connection being very strong and of a high degree of electrical conductivity at least equal to that of cable 17 and jaw member 14. The problems usually arising at this point due to a relatively poor connection between the jaw and cable are accordingly eliminated, and it is also feasible to position the connection quite close to the electrode gripping portion of the jaw member without fear of resultant rapid deterioration. This results in a considerable saving in weight and permits the jaw member to be made of relatively expensive but otherwise desirable material such as beryllium copper since the total size of such member is much reduced.

In order to eliminate any flexing of cable 17 in the region where its insulation 18 has been removed closely adjacent the welded connection 19, ears or tabs 20 are provided at the end of sheet metal body member 2 which may be crimped in to engage the insulated cable 18 to ensure rigidity between such point of engagement and the welded connection. Additionally, a plug 21 of rubber or like synthetic plastic material may be inserted in the end of tubular handle 1 with cable 18 passing through and closely fitting a central aperture in such plug, thereby further rigidifying such cable and preventing abrasion of the latter against the extreme end of handle 1. The plug may be longitudinally split as at 22 to facilitate insertion of cable 18.

A leaf spring 23 is mounted on the upper surface of sheet metal body member 2, one end being inserted beneath a struck-up portion 24 of the latter and welded in place. This spring protrudes upwardly at an angle through a slot 25 in tubular handle 1 toward tong member 12 and is adapted resiliently to bear against a roller 26 mounted in such tong to urge jaw 13 toward jaw 14. Such protruding portion of spring 23 is enclosed in insulating material 27 so that even if the operator should inadvertently touch the same while welding no harm can result therefrom. The outer end portion of tong handle 12 will likewise be enclosed in tubular insulating material 28.

While the jaw members and closely associated parts of the electrode holder are not likely to be touched by the operator during use, it is nevertheless desirable as shown in Buttaci et al. Patent No. 1,943,754 to provide insulation therefor so that arcing will not result should these parts inadvertently be caused to contact the work or other metal object. Accordingly, I secure a molded layer of insulating material 29 to lower jaw member 14 by means of a screw 30 countersunk in such material, such insulating material extending along the sides and end of such jaw member but not to an extent where it will interfere with gripping of an electrode by such jaw. A porcelain enameled sheet metal stamping 31 conforms to and encloses such insulating material 29 except for the edge portions of the latter where the same extend along the sides and end of jaw 14, the insulating material there protruding slightly to protect the edges of stamping or shell 31 from possible contact with an electrode gripped between the jaws. Such protruding lip of insulating material (which, however, will not ordinarily project outwardly beyond such shell) also reduces the likelihood of welding spatter forming a bridge between the jaw and outer shell. Of course, the porcelain enamel coating which extends over the entire surface of shell 31 is itself an insulating material which unless broken away serves effectively to prevent the making of an electric contact therewith. The rearward portion of such shell is flared partially to encircle the extreme end of tubular insulating handle 1 and is secured thereto by means of screws 32.

Tong 12 and upper jaw member 13 are similarly protected by insulating material 33 which extends along the sides and end of the same to a point slightly spaced from the electrode gripping face of jaw 13. Such insulating material is enclosed by a sheet metal stamping or shell 34 held in place by a screw 35 which passes through such shell, insulation 33, an insulated aperture in channelform tong member 12 and threadedly engages a stud or nut 36 of insulating material enclosed within channelform tong handle 12. The lower edges of such insulating material 33 protrude outwardly below the edges of shell 34 in the same manner that insulating material 29 similarly protects shell 31. It will thus be seen that not only is the operator thoroughly protected, but also any danger of arcing is avoided should the operator inadvertently touch a "hot" holder to the work-piece or other metal object.

In an attempt to provide a handle which will remain cool enough for the operator to hold the same for an extended period of time, it has been the usual procedure to ventilate such handle to the extent possible. This has been deemed necessary primarily due to the large amount of heat which has been conducted thereto by the current carrying jaw of the holder as well as by the heat developed at the electrical connection between such jaw and the cable. In the case of my new holder, however, wherein the development and transmission of such heat is much reduced, I have found it to be preferable to close the ends of tubular handle member 1 to the extent practicable to trap a body of air therein which itself serves as an insulating medium. Accordingly, I provide no apertures or perforations in such tubular handle and by means of plug 21 and stamping 31 substantially close the ends of the handle to trap the air therein. Not only is heated air prevented from contacting the hand, but also the cable, which may itself become very warm, cannot touch the handle. When using plug 21 it is not essential that tabs 20 be crimped in to grip the cable although, of course, they will afford additional support. It has been found in practice that my new holder may be used for an indefinite period without overheating and without becoming uncomfortable to the operator.

Now referring more particularly to Figs. 10–12 inclusive of the drawing, the embodiment of my invention there illustrated desirably utilizes most of the features above described and accordingly only certain details require to be shown and explained below.

A sheet metal body portion 37 generally similar in construction to body portion 2 is mounted within a principal tubular handle 38 of insulating material resembling handle 1. Cable 18 passes through such handle and body portion and is cast welded to lower jaw member 39 in the same manner. The principal difference resides in the type of spring means provided to urge upper jaw member 40 toward jaw 39. Ears or tabs 41, 42 and 43 are struck up from sheet metal body member 37 to support a block of insulating material 44 having a steel pin 45 inset therein to serve as a mounting for compression spring 46. A notched fulcrum block 47, which may desirably be of insulating material, is secured within channelform tong handle 48 by means of a screw 49 and is engaged by the beveled end 50 of rod 51, the other end of which engages and bears against such spring 46. It will thus be seen that such spring tends normally to urge jaw 40 into clamping position relative to jaw 39 (as shown in solid line in Fig. 10). When the operator, however, moves tong handle 48 toward dotted line position as shown in Fig. 10, spring 46 will be slightly further compressed (on the order of 1/8 to 1/4 of an inch) with the point of engagement of rod end 50 with wear block 47 moving in an arcuate path about pivot 52. In other words, such movement of tong handle 48 initially causes relatively consequential reciprocation of rod 51, the degree of which is progressively reduced as the jaw 40 approaches fully opened position. It will thus be seen that the force of spring 46 and therefore the clamping action of jaw 40 will be maintained substantially uniform in all position of the latter, no matter what size electrode is being held between the jaws.

Obviously, a very compact form of electrode holder is thus obtained greatly facilitating manipulation of the same in confined quarters and permitting the tong handle to be squeezed down closely adjacent the principal handle 38. The spring mechanism is enclosed and concealed within slightly humped end portion 53 of tubular handle 38 and block 47 may additionally be formed of insulating material. Tong handle 48 will, of course, be enclosed in insulating material as explained above and rod 51 may also desirably be insulated where exposed.

As best shown in Fig. 12, the block 44 of insulating material supporting spring 46 also serves as a "key" in locking the body portion 37 against rotation within handle 38. A screw 54 may be employed releasably to secure such block to such handle. If desired, block 44 may be of metal welded to body portion 37 and provided with an insulating washer between it and spring 46. In the latter case, screw 54 may itself be of insulating material since it is not subjected to much strain.

Both the Fig. 1 and Fig. 10 forms of electrode holders present an additional important advantage over prior art holders in that the lower jaw members 14 and 39 may be detached from the body portion carrying the tongs and secured to handles 1 and 38 merely by removing the sheet metal shell 31 and screw 15. Tabs 20 will be spread apart and upon pulling cable 18, such cable and the lower jaw member attached thereto may be axially withdrawn from the holder. The cable may then be cut and the old jaw member discarded, a new jaw member cast welded thereto, and the cable and jaw reinserted in the holder. When joining the cable to a new jaw member, the ends of the cable and extension 16 of the jaw may merely be juxtaposed in an appropriate graphite mold and the molten weld metal supplied thereto as taught in the aforesaid Cadwell patent. The Cadwell process is highly efficient in joining such articles as stranded copper cable to steel and may be thus employed to attach a case-hardened steel jaw to the cable. Such jaws are cheap and long-wearing, and may be so short that no substantial current-carrying capacity is sacrificed. By contrast, it is practically impossible to arc weld such cable (which may comprise 5000 copper strands, for example) to the jaw member, and silver solder is expensive and may melt if overheated during use of the holder. Moreover, such solder is not satisfactory for use with old cable where the strands have formed an oxide coating. My new holder not only has an exceptionally long life, but also may be very quickly and easily repaired when this eventually becomes necessary.

I have further found it desirable to provide a relatively heavy pivot pin for the tongs (¼ inch diameter, for example) and to make such pin of wear-resisting conductive material such as Phosphor bronze. Such pin will desirably be welded to the tongs and the force of the spring 23 or 46 is effective to maintain good contact pressure between the pin and block 9. The upper, or tong, jaw member 13 has a smooth electrode-engaging face to which weld spatter does not readily adhere whereas the grooved jaw 14 tends to become clogged with spatter unless the operator periodically cleans the same. By making jaw 13 of copper or copper alloy having good conductivity sufficient current can flow from the rear portion of jaw 14 through block 9 and pivot 11 to the tong jaw 13 to maintain the welding current to the electrode even when the electrode-gripping surface of jaw 14 has become somewhat clogged. In the past, spatter accumulation on the grooved jaw has caused the holder to become too hot to hold. Of course, until jaw 14 becomes clogged it will carry by far the major current load to the welding electrode under normal operation.

The insulated handle 1 and the tong grip insulation 28 will ordinarily be of vulcanized fiber. The jaw insulating material 29, 33 may preferably be of "Rosite" or like heat-resistant material which will not readily crumble upon being subjected to the high temperatures encountered in use. Certain fiber glass—melamine resin molded materials are also suitable for this purpose. Since heat-resistant insulating materials are generally not very resistant to shock I provide the outer sheet metal shields 31 and 34 which may desirably be porcelain enameled. The enamel coating is not essential, however, since such shields are insulated from the current-carrying members, but it improves appearance, has an insulating effect of its own, and prevents rusting in storage.

Plug 21 may be of sponge rubber cemented in place within tubular handle 1, better to cushion the cable where the latter leaves such handle. When attaching a new jaw 14, the handle and parts associated with inner body 2 may be slid back along the cable after removing screw 15 so that the end of the cable is conveniently accessible for cast welding the new jaw thereto.

Since a cast copper connection produced as taught in Cadwell Patent No. 2,229,045 is both physically strong and of high conductivity there is no danger of failure of the connection itself even though, as shown, such connection may desirably be relatively close to the electrode-gripping portion of the grooved lower jaw member.

Other modes of applying the principle of the invention may be employed, change being made as regards the details described, provided the features stated in any of the following claims or the equivalent of such be employed.

I therefore particularly point out and distinctly claim as my invention:

1. In a manual arc welding electrode holder having a principal handle of tubular insulating material, a sheet metal generally channelform body portion secured within such handle and projecting from one end thereof, a metal block joined to said projecting body portion, a beryllium copper alloy jaw member firmly but releasably secured to said block and provided with electrode-engaging grooves in one face thereof, an electrode clamping metal tong comprising an elongated insulated handle extending generally parallel to such principal handle and a copper jaw having a smooth electrode-engaging face opposed to said first jaw member, an electrically conductive pivot pin welded to said tong and passing through said block pivotally to secure said tong to said block, a coil spring mounted on said body portion within such tubular insulated handle, said spring being insulated from the former and extending generally parallel to the latter, a rod engaging said spring at one end and pivotally engaging said tong handle at the other end with said spring normally somewhat compressed to urge said tong jaw toward said first jaw, an insulated current-carrying copper cable extending through such tubular handle and lying within said sheet metal body portion the end of said cable being cast-welded to the inner end of said first jaw member, tabs on said body portion adapted to grip said insulated cable to prevent flexing of said cable closely adjacent such welded connection, a resilient plug surrounding said cable where the latter enters such tubular handle and closing such end of said handle, insulation enclosing said respective jaw members except in the region of their opposed electrode-engaging surfaces, and outer sheet metal shields secured to said tong and such tubular handle respectively and respectively enclosing and supporting said insulation of said jaw members.

2. In a manual arc welding electrode holder having a principal handle of tubular insulating material, a sheet metal generally channelform body portion secured within such handle and projecting from one end thereof, a metal block joined to said projecting body portion, a metal jaw firmly but releasably secured to said block and provided with electrode-engaging grooves in one face thereof, an electrode clamping metal tong comprising an elongated insulated handle extending generally parallel to such principal handle and a jaw having a smooth electrode-engaging face opposed to said first jaw member, an electrically conductive pivot pin welded to said tong and passing through said block pivotally to secure said tong to said block, a coil spring mounted on said body portion within such tubular insulated handle, said spring being insulated from the former and extending generally parallel to the latter, a rod engaging said spring at one end and pivotally engaging said tong handle at the other end with said spring normally somewhat compressed to urge said tong jaw toward said first jaw, an insulated current-carrying copper cable extending through such tubular handle and lying within said sheet metal body portion, the end of said cable being cast-welded to the inner end of said first jaw member, means on said body portion tightly confining said insulated cable to prevent flexing of said cable adjacent such welded connection, insulation enclosing said respective jaw members except in the region of their opposed electrode-engaging surfaces, and outer sheet metal shields secured to said tong and such tubular handle respectively and respectively enclosing and supporting said insulation of said jaw members.

3. In a manual arc welding electrode holder having a principal handle of tubular insulating material, a sheet metal body portion secured within such handle, a metal block joined to said body portion, a metal jaw firmly but releasably secured to said block, an electrode clamping tong pivotally secured to said block for cooperation with said jaw, said tong having an insulated handle extending generally parallel to such tubular handle, a compression spring mounted on said body portion within such tubular handle, a rod engaging said spring at one end and pivotally engaging said tong handle at its other end near the point of pivotal attachment of said tong to said block, said spring thereby urging said tong into clamping cooperation with said jaw, an electric cable extending through such tubular handle and cast-welded to the inner end of said jaw, and means within such tubular handle clamping said cable to prevent flexing of the latter in the region of such cast-welded connection.

4. A manual arc welding electrode holder comprising a tubular, generally cylindrical, principal handle of insulating material, a sheet metal body portion secured within said handle, a metal block joined to said body portion and projecting beyond one end of said handle, an electrode-gripping conductive jaw member firmly but removably secured to said block and adapted to have the end of an electric cable connected thereto, a tong pivotally mounted on said block and carrying a jaw member adapted to cooperate with said first jaw member to grip an electrode therebetween, a localized outward bulge in said tubular handle in the end portion of the latter adjacent said block and on the side toward said tong, a block of insulating material mounted on said body portion and fitting snugly within said bulge in said handle, a coil spring mounted with one end supported by said block of insulating material and extending generally in the direction of such pivotal mounting of said tong, a rod engaging the other end of said spring operative to compress the latter, said rod pivotally engaging said tong on the side of such pivotal connection opposite to such jaw member carried thereby and only slightly spaced from such connection, whereby said tong may be rocked toward said handle to open said jaws against the force of said coil spring with little change in the degree of compression of said spring, said rod being insulated from said tong, and insulation enclosing said rod where the latter is exposed between said tubular handle and said tong.

5. An arc welding electrode holder comprising a tubular handle of insulating material having a localized outward bulge in one end portion thereof, a body portion secured within said handle carrying a rigid jaw member adapted to have an electric cable connected thereto, another jaw member pivotally connected with said first jaw member for electrode-gripping cooperation therewith and provided with an operating handle extending alongside said tubular handle on the side having such bulge, a coil spring supported by said body portion but insulated therefrom, said spring lying within such bulge and extending generally parallel to said tubular handle and in the general direction of such pivotal connection, and a rod engaging said spring at one end and pivotally engaging such operating handle at its other end at a point slightly spaced from such pivotal connection of said pivotally mounted jaw member on the other side of such pivot from said jaw member, whereby said operating handle may be rocked toward said tubular handle to open said jaws against the force of said coil spring with little change in the degree of compression of said spring.

6. An electrode holder comprising a principal tubular handle of insulating material, a sheet metal body portion secured within said handle and affording passage for an electric cable therethrough, said sheet metal body portion extending a substantial distance within said tubular handle, a conductive jaw member rigidly but detachably secured to said body member, an electrode clamping tong member pivotally mounted for cooperation with said jaw member, resilient means actively urging said tong to electrode clamping position, an insulated electric cable extending through said tubular handle and body portion and cast-welded to the inner end of said jaw member, and means on said body portion within said handle adapted to grip said cable in a region spaced from such weld.

7. An electrode holder comprising a principal tubular handle of insulating material, a box-like sheet metal body portion secured within said handle and affording passage for an electric cable therethrough, said body portion extending a substantial distance within said tubular handle, a conductive jaw member rigidly but detachably secured to said body member and adapted to have an electric cable attached directly thereto, an electrode clamping tong member pivotally mounted for cooperation with said jaw member, resilient means actively urging said tong to electrode clamping position, the end of said body portion spaced from said jaw member being deformable to grip such cable within said handle at a point spaced from the electrical connection of said jaw member and cable.

8. In an electrode holder comprising a principal handle of tubular insulating material, a box-like sheet material body member firmly secured within said handle and extending a substantial distance therewithin, a conductive jaw member rigidly but releasably secured to said body member closely adjacent the end of said tubular handle and extending generally axially of said handle, the inner end of said jaw member terminating adjacent such end of said handle, an electrode clamping tong pivotally connected to said body member adapted to cooperate with said jaw, and resilient means actively urging said tong to electrode clamping position; an electric cable extending through said tubular handle and cast-welded directly to the inner end of said jaw member, and a portion of said sheet material body member within said tubular handle spaced from such weld clamping said cable to prevent flexing of the latter in the region of such cast-welded connection, whereby said jaw may be released from said body member and withdrawn together with the contiguous portion of the attached cable for substitution of a new jaw and convenient reassembly.

9. An electrode holder comprising a tubular handle of insulating material, a sheet material body member firmly secured within said handle and affording a passage for a cable therethrough, said body member extending a substantial distance within said handle and protruding therefrom at one end, a short conductive jaw member detachably secured to said protruding end portion of said body member and extending generally axially of said handle, and clamping means pivotally mounted on said body member adapted to cooperate with said jaw member to grip an electrode therebetween, the inner end of said jaw member being formed with a stud for the cast welding of a cable end axially thereto and said body member providing passage for such cable through said handle to said jaw member, whereby said jaw may be cast welded directly to said cable to form one unit readily separable from the other elements of said holder which comprises another assembled unit.

10. An electrode holder comprising a tubular handle of insulating material, a body member secured within said handle and projecting from one end thereof, said body member being formed to afford a passage longitudinally therethrough and extending a substantial distance within said tubular handle, a conductive jaw member detachably secured to such projecting portion of said body member, clamping means mounted for cooperation with said jaw member to grip an electrode, an electric cable passing through said handle and body member and connected to said jaw member near the end of said handle from which said body member projects, and means on said body member within said handle spaced from such connection gripping said cable to prevent flexing of the same in the region of such connection.

References Cited in the file of this patent

UNITED STATES PATENTS

| Number | Name | Date |
| --- | --- | --- |
| 1,450,294 | Jerry | Apr. 3, 1923 |
| 1,697,864 | Green | Jan. 8, 1929 |
| 1,860,262 | Niemann | May 24, 1932 |
| 2,174,809 | Varner | Oct. 3, 1939 |
| 2,229,045 | Cadwell | Jan. 21, 1941 |
| 2,375,657 | Jackson | May 8, 1945 |
| 2,386,399 | Jackson | Oct. 9, 1945 |
| 2,485,360 | Colinet | Oct. 18, 1949 |

FOREIGN PATENTS

| Number | Country | Date |
| --- | --- | --- |
| 623,304 | Great Britain | May 16, 1949 |